United States Patent [19]
Steiert

[11] Patent Number: 5,796,332
[45] Date of Patent: Aug. 18, 1998

[54] DIAGNOSTIC SYSTEM FOR SENSING AND DISPLAYING FUNCTIONS OF A MOTOR VEHICLE HEATING APPARATUS

[75] Inventor: Edwin Steiert, Wolfschlugen, Germany

[73] Assignee: J. Eberspächer GmbH & Co., Esslingen, Germany

[21] Appl. No.: 836,684

[22] PCT Filed: Oct. 2, 1995

[86] PCT No.: PCT/EP95/03891

§ 371 Date: Apr. 24, 1997

§ 102(e) Date: Apr. 24, 1997

[87] PCT Pub. No.: WO96/13397

PCT Pub. Date: May 9, 1996

[30] Foreign Application Priority Data

Oct. 26, 1994 [DE] Germany .................. 44 38 277.4

[51] Int. Cl.⁶ .................................................. G60Q 1/00
[52] U.S. Cl. .................... 340/438; 340/461; 340/525; 364/424.034; 237/2 A
[58] Field of Search .................... 340/438, 461, 340/525, 825.06; 364/424.034, 424.045, 424.039; 237/12.3 C, 2 A

[56] References Cited

U.S. PATENT DOCUMENTS

| | | | |
|---|---|---|---|
| 4,497,057 | 1/1985 | Kato et al. | 340/461 |
| 4,773,588 | 9/1988 | Okada | 237/2 A |
| 4,906,970 | 3/1990 | Momura | 340/525 |
| 5,063,513 | 11/1991 | Shank et al. | 237/12.3 C |
| 5,369,584 | 11/1994 | Kajiwara | 364/424.05 |
| 5,638,060 | 6/1997 | Kataoka et al. | 364/188 |

*Primary Examiner*—Jeffery Hofsass
*Assistant Examiner*—Anh La
*Attorney, Agent, or Firm*—McGlew and Tuttle

[57] ABSTRACT

A diagnostic system for sensing and displaying malfunctions of a heating apparatus installed in a vehicle, wherein the display is effected by a display device of an on-board timer for the heating apparatus.

8 Claims, 1 Drawing Sheet

DIAGNOSTIC SYSTEM FOR SENSING AND DISPLAYING FUNCTIONS OF A MOTOR VEHICLE HEATING APPARATUS

FIELD OF THE INVENTION

The invention relates to a diagnostic system for sensing and displaying the manner in which functions are performed, in particular malfunctions, in a heating apparatus, especially an additional heating apparatus, installed in a vehicle, including a controller for controlling the functions of the heating apparatus, a monitoring means for monitoring the correctness of the functions and for issuing malfunction signals in case of improper functions, a diagnosis memory for storing at least the occurrence of malfunction signals, and a display device for displaying malfunction signals stored in said diagnosis memory.

BACKGROUND OF THE INVENTION

The electronic system controlling the functions of the heating apparatus is also responsive to malfunctions. The heating apparatus is usually put out of operation then. To this end, there is provided a monitoring means monitoring the functions of the heating apparatus with respect to the correctness thereof or with respect to the occurrence of malfunctions. Malfunction signals indicating the occurrence of malfunctions are usually stored in a diagnosis memory, in the form of error codes. In case the diagnosis memory is composed with an EEPROM, the error codes are permanently stored in the diagnosis memory. For motor vehicles of more recent construction dates, there are diagnostic systems which are used by motor vehicle garages for finding malfunctions of the motor vehicle, in particular of the engine and the electronic system of the engine. The motor vehicle electronic system is provided with a diagnostic connector through which a diagnostic apparatus may be connected. The diagnostic apparatus comprises a display device by means of which malfunctions of the motor vehicle can be displayed. Additional heating apparatus for motor vehicles are thus usually equipped with controllers permitting communication of the diagnosis memory of the heating apparatus with the diagnostic apparatus used for inspection of the motor vehicle.

Different motor vehicle manufacturers employ different data transfer methods for reading out information, in particular malfunction information, through the respective diagnostic apparatus connectable thereto. The diagnostic apparatus usable in each particular case must be matched to the data protocol corresponding to the respective specific data transfer method employed. For rendering the diagnostic information of the heating apparatus displayable via the diagnostic apparatus used for a particular motor vehicle, the controller of the heating apparatus must be matched individually to the data transfer method used for a particular vehicle type, or it must be matchable thereto by selection. In order to avoid that a plurality of different heating apparatus with corresponding individually matched controllers have to be provided, but to allow instead the use of just one single type of heating apparatus, the controller of the heating apparatus has to be provided with a multiplicity of data transfer methods along with the associated data protocols which may be retrieved selectively in order to permit cooperation of the diagnostic system of the heating apparatus with the diagnostic apparatus usable for a specific motor vehicle type. This entails a considerable circuit expenditure in the controller of the heating apparatus, along with a correspondingly high expenditure of components and costs.

A possibility of getting away from this problem consists in providing in the motor vehicle a display lamp which, in accordance with the particular malfunction to be displayed, indicates an error code by way of a specific blinking sequence. The user must be capable of interpreting and evaluating the error code indicated by the blinking sequence. This may easily result in interpretation errors, even when the blinking code is employed in a garage authorized to repair the heating apparatus. This risk is particularly high when a larger number of malfunctions can be diagnosed and displayed. For reducing the frequency of misinterpretations in this respect, it is possible to greatly restrict the number of the displayable blinking codes and thus the number of the displayable malfunctions, so that only selected errors are still indicated, for example overheating of the heating apparatus. This entails the serious drawback that the additional, not displayable malfunctions are no longer recognizable via the diagnostic display and treatable. For example, it may also be of interest to detect by means of the diagnostic system not only malfunctions that have already occurred, but also to obtain trend displays by means of which the trend towards a malfunction can be diagnosed at an early stage.

SUMMARY AND OBJECTS OF THE PRESENT INVENTION

It is the object of the invention to make available a diagnostic system of the type indicated at the outset, which permits the display also of a large number of possible malfunctions and, if desired, also of error tendencies in an easily readable manner, with as little circuit expenditure and costs as possible and independently of the individual motor vehicle types.

According to the invention, a diagnostic system is provided for sensing and displaying the manner in which functions are performed, in particular for sensing and displaying malfunctions, of a heating apparatus installed in a vehicle. The system includes a controller for controlling the functions of the heating apparatus. A monitoring device is provided for monitoring the correctness of the functions and for issuing malfunction signals in case of functions not performed properly. A diagnosis memory is provided for storing at least the occurrence of malfunction signals. A display device is provided serving for displaying malfunction signals stored in the diagnosis memory, the display device includes a display device of a timer provided in the vehicle for timing the heating apparatus and having a switching time input device. The timer includes an error code decoder decoding error codes, which are read out from the diagnosis memory in accordance with various detectable malfunctions, into display signals that are fed to the display device of the timer and effect an error display there. The switching time input device is provided for inputting the functions of the heating apparatus to be controlled by the timer and the switching time at which this function is to be carried out. The timer has a timing signal decoder by means of which the function input and the switching time input are decoded into display signals for the display device. The timing signal decoder and the error code decoder are constituted by one single common decoder.

Additional heating apparatus for motor vehicles, but also for cranes, excavators etc., nowadays are as a rule provided with a timer, through the control of which the heating apparatus is turned on and/or off at a preset time. This allows, for example, preheating of a motor vehicle during a presettable period of time before the motor vehicle is being used. Such a timer has a display device on which the desired switching on and/or switching off time can be displayed for the purpose of setting the switching times and for the purpose of checking the set switching times. The invention is based on the idea of providing the heating apparatus with an independent diagnostic system, i.e. an on-board diagnostic system that is not dependent on diagnostic apparatus used for diagnosing the individual motor vehicle types, in that the display device of the on-board timer is employed for the heating apparatus.

The same display elements of the display device of the timer may be used for displaying the timing signals and the error codes. The common decoder may perform, in reversible manner, either timing signal decoding or error code decoding and may deliver to the display elements of the display device display signals corresponding either to the timing signals or to the error codes, depending on the particular switching state.

The display device of the timer, in addition to the indications related to the heating apparatus, may be adapted to display further indications, for example the time, the outside temperature measured by an external thermometer of the vehicle, and the like.

The timer may comprise a diagnosis request device which, in predetermined time intervals and/or in case of manual operation by the user of the vehicle or a maintenance or repair service for the heating apparatus, effects taking over of stored error codes in the error code decoder and thus results in a display of malfunctions of the heating apparatus that possibly have occurred.

Error codes stored in the diagnosis memory may be continuously transferred to the common decoder. The common decoder may have an automatic selection means associated therewith which controls the common decoder so as to issue either display signals resulting in indication of error codes on the display device, or to issue display signals resulting in display of other information, such as the timing indication and possibly the time, outside temperature etc.

The selection means may include a priority means which, upon transfer of an error code from the diagnosis memory, controls the common decoder so as to issue display signals for displaying the error code.

The timer may be provided with a resetting means through which the diagnosis memory can be reset by the timer upon elimination of the cause for displaying error codes.

The monitoring device comprises a tendency detecting means through which functions of the heating apparatus can be detected which are not yet rated as malfunctions but indicate a tendency towards the occurrence of malfunctions. Such tendency signals delivered by the tendency detecting means can be stored in the diagnosis memory in the form of tendency codes. The tendency codes can be transferred to the error code detector of the timer. The timer may be provided with a selecting means operable by the user of the vehicle or starting operation automatically, by means of which received tendency codes can be suppressed or indicated as regards indication thereof by the display device of the timer.

The invention will now be elucidated in more detail by way of an embodiment shown in the sole accompanying drawing FIGURE.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention are illustrated.

BRIEF DESCRIPTION OF THE DRAWINGS

In the drawings:

The only FIGURE is a block circuit diagram

DESCRIPTION OF THE PREFERRED EMBODIMENT

Figure 1:
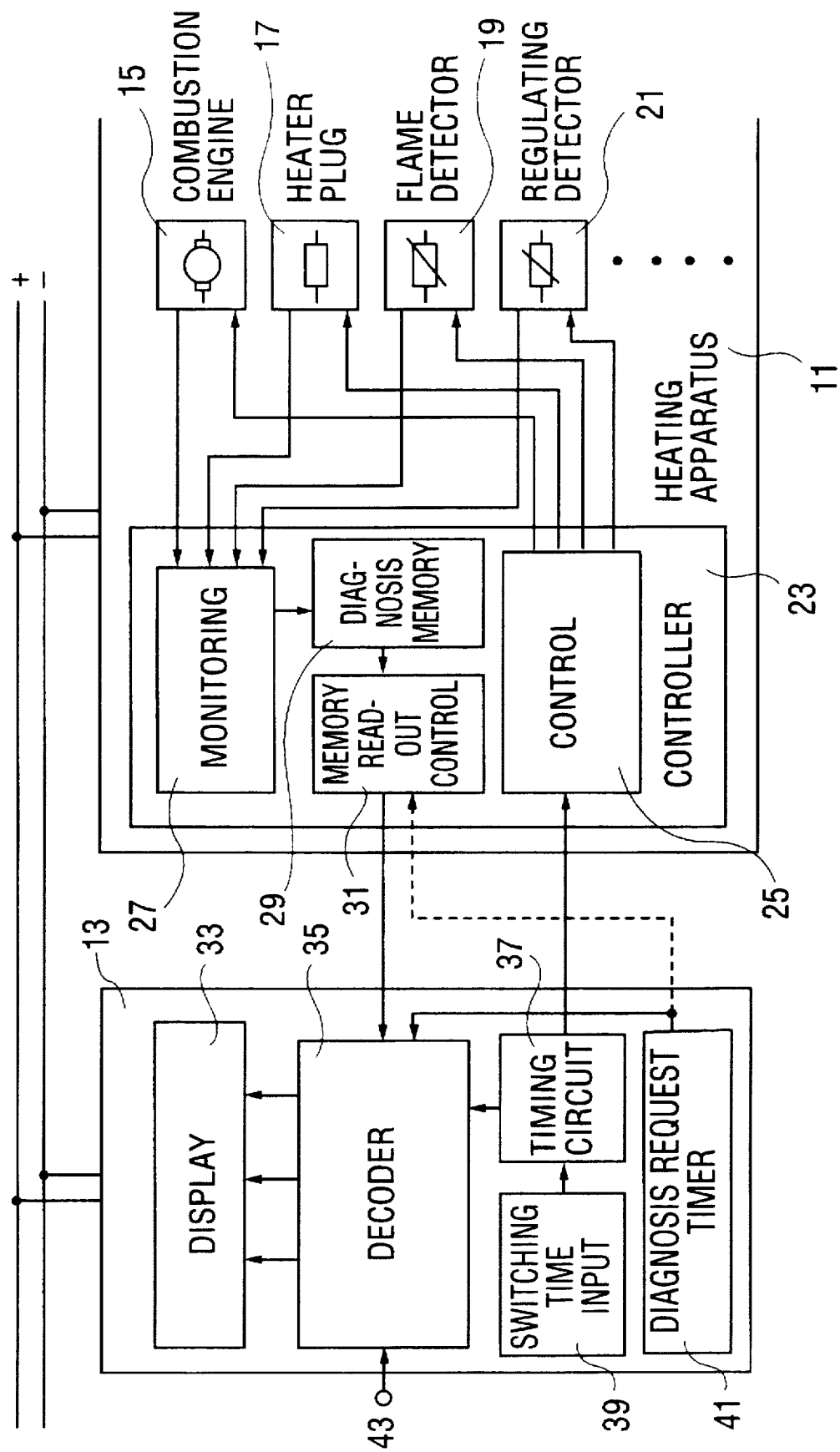

Referring to the drawing in particular, the drawing shows schematically a block circuit diagram, a heating apparatus 11 and a timer 13. The heating apparatus 11 preferably is an additional heating apparatus of a motor vehicle, which may be used as an auxiliary heating apparatus for heating while the engine is not running, or an additional heating apparatus while the engine is running and the vehicle heating system fed by the engine cooling system is in operation.

The heating apparatus 11 and the timer 13, in the embodiment shown, are fed from the same energy source, namely a current supply source having a positive terminal and a negative terminal. The distribution of the current supply to the individual components of heating apparatus 11 and timer 13 is not shown.

The heating apparatus comprises, in the usual and known manner, a plurality of components, such as a combustion engine 15, a heater plug 17 for igniting the heating apparatus fuel, a flame detector 19 and a regulating detector 21. Additional components may be provided, as indicated by the four dots below the aforementioned components 15 to 21.

The heating apparatus 11 comprises a controller 23 for controlling the functions of the individual components 15 to 21 of the heating apparatus 11. The controller 23 to this end comprises a control means 25. Especially for reasons of safety, the functions of the individual components 15 to 21 of the heating apparatus 11 are continuously monitored with the aid of a monitoring device 27. The monitoring device 27 is suitable on the one hand for detecting serious malfunctions resulting in safety switching-off of the heating apparatus 11, on the other hand, it is also possible to detect less serious malfunctions or functional trends announcing a possible or imminent malfunction.

When the heating apparatus has been put out of operation, i.e. switched off, by the monitoring device due to a serious malfunction, elimination of the cause of the malfunction with as little expenditure as possible is to be rendered possible in that an indication is provided as to what malfunction caused standstill of the heating apparatus 11. But also in case of less serious malfunctions, for example malfunctions which, though not cogently resulting in switching off of the heating apparatus 11, do no longer permit optimum operation thereof, it is advantageous to obtain an indication of the existing malfunction during maintenance or repair of the heating apparatus 11. Indication of a malfunction is particularly valuable when a malfunction does not occur permanently but only from time to time, and not at the time during maintenance or repair of the heating apparatus 11.

For being able to find out under all these circumstances which malfunction is present at the moment or has occurred therebefore, malfunctions detected by the monitoring device 27 are stored in a diagnosis memory. This is preferably an EEPROM memory, i.e. a programmable non-volatile read-only memory whose memory contents can be erased electronically. The various malfunctions are stored in the diagnosis memory 29 in the form of different error codes. These can be read out from the diagnosis memory at the desired moments of time with the aid of a memory read-out control 31.

The timer 13 comprises in usual manner a display device 33 having display elements (not shown in detail in the FIGURE) whose operation is controlled by a decoder 35. The latter delivers to the display device 33 display signals resulting in display of specific information. Timer 13 comprises furthermore a timing circuit 37 which may be preset by the user of the motor vehicle provided with the heating apparatus 11 to desired switching-on times and/or switching-off times by means of a switching time input device 39. Timing control 37 comprises a clock not shown in the FIGURE itself. When the switching times preset by means of the switching time input device 39 have been reached, the timing circuit 37 delivers corresponding control signals to the control means 25 of the heating apparatus 11, which then controls the individual components 15 to 21 of the heating apparatus 11 in corresponding manner.

Timing circuit 37 supplies to decoder 35 a signal that may be decoded by decoder 35 and displayed on display device 33. In this manner, the following information, for example, may be displayed on display device 33:the current time, the switching-on time and the switching-off time of the heating apparatus 11. In addition thereto, the display device 33 may be utilized during selection of the switching-on time and/or the switching-off time by actuation of the switching time input device 39.

Decoder 35 furthermore is connected to memory readout control 31 through which decoder 35 may be fed with the error codes stored in diagnosis memory 29. After decoding thereof in decoder 35, the stored error codes may then be displayed by display device 33.

Timer 13 comprises furthermore a diagnosis request device 41 that is connected to decoder 35 and furthermore may be connected to the memory read-out control 31 (for this reason, the latter connection is shown in broken lines). With the aid of the diagnosis request device 41, an operator, either the user of the motor vehicle or a maintenance technician, can obtain an indication of malfunctions stored in diagnosis memory 39 on display device 33. In this respect, it is possible by a corresponding input via the diagnosis request device 41 to obtain a display only of one malfunction or of a choice of stored malfunctions, or all malfunctions stored may be indicated at the same time when the display device 33 has a corresponding display capacity.

It is possible to provide for the timing control and for the error diagnosis display a separate decoder each or, as in case of the embodiment shown in the FIGURE, a common decoder for the timing function and the diagnosis display function.

When the display device 33 has a sufficiently great display capacity, one or more malfunctions stored in diagnosis memory 29 may be indicated in addition to a continuously displayed signal, for example the current time. However, the diagnostic system may also be designed such that timer 13 is provided with an automatic selection means through which, in case time signals and malfunction signals are present at the same time, an automatic selection (preferably in preselectable manner) is made such that only one of these two signal types is displayed. For example, the decoder 35 may have a priority means (not shown) associated therewith by means of which a display priority is allocated to malfunction signals coming from the memory read-out control 31 in such a manner that upon occurrence of a malfunction and storage thereof in diagnosis memory 29, the display indicated so far, for example the time indication, is interrupted and the malfunction is displayed in order to inform the user of the motor vehicle thereof immediately as of the occurrence of the malfunction.

It is also possible to design the diagnostic system such that the error codes, provided that such codes are stored in diagnosis memory 29, are transmitted by timer 13 only upon request. This can take place automatically, for example, after predetermined time intervals or time intervals that are adjustable via the diagnosis request device 41. If however the "freerunning telegram" method is employed, in which the error codes stored in diagnosis memory 29 are permanently transferred to decoder 35 via memory read-out control 31, the decoder 35 controls at what time and whether the detected malfunctions are displayed, for example in accordance with the aforementioned priority routine.

Timer 13 in preferred manner is provided with a resetting means (not shown) by means of which diagnosis memory 29 can be reset or erased by means of timer 13 after the cause of the malfunction stored in diagnosis memory 29 has been eliminated.

Decoder 35, in the manner shown in the FIGURE, may be provided with an additional signal input 43 through which additional signals may be supplied from the vehicle. It is thus possible, for example, to display the outside temperature measured by an external thermometer of the motor vehicle on display device 33, or the like.

While a specific embodiment of the invention has been shown and described in detail to illustrate the application of the principles of the invention, it will be understood that the invention may be embodied otherwise without departing from such principles.

I claim:

1. A diagnostic system for sensing and displaying the manner in which functions are performed for sensing and displaying malfunctions of a heating apparatus installed in a vehicle, said system comprising:

a controller for controlling the functions of the heating apparatus;

a monitoring device for monitoring the correctness of the functions and for issuing malfunction signals in case of functions not performed properly;

a diagnosis memory for storing at least the occurrence of malfunction signals;

a timer provided in the vehicle for timing the heating apparatus, said timer having a switching time input device for input of functions of the heating apparatus to be controlled by said timer and for input of a switching time at which said functions are to be carried out, error code decoder means for decoding error codes, which are read out from said diagnosis memory in accordance with various detectable malfunctions, into display signals and timing signal decoder means for decoding a function input and a switching time input into display signals, said timing signal decoder means and said error code decoder means being provided in a single common decoder, said timer including a display device for displaying said display signals.

2. The diagnostic system according to claim 1, wherein said display device includes display elements used for displaying timing signals and the error codes, and said common decoder performs, in reversible manner, either timing signal decoding or error code decoding and delivers to said display elements of the display device said display signals corresponding either to the timing signals or to the error codes, depending on a particular switching state.

3. The diagnostic system according to claim 1, wherein said display device of said timer displays further indications including an outside temperature measured by an external thermometer of the vehicle.

4. The diagnostic system according to claim 1, wherein said timer includes a diagnosis request device which effects taking over stored error codes in the error code decoder resulting in a display of malfunctions of the heating apparatus that possibly have occurred, said diagnosis request occurring at least at one of predetermined time intervals and by input command of a user.

5. The diagnostic system according to claim 2, wherein said error codes stored in said diagnosis memory are continuously transferred to said common decoder, said common decoder having an automatic selection means associated therewith for controlling said common decoder so as to issue either display signals resulting in indication of error codes on the display device, or to issue display signals resulting in display of other information including a timing indication.

6. The diagnostic system according to claim 5, wherein said selection means includes priority means which, upon transfer of an error code from the diagnosis memory, controls said common decoder so as to issue display signals for displaying said error code.

7. The diagnostic system according to claims 1, wherein said timer is provided with a resetting means through which said diagnosis memory can be reset by the timer upon elimination of a cause for displaying error codes.

8. The diagnostic system according to claim 1, wherein said monitoring device comprises a tendency detecting means through which tendency signals are generated representing functions of said heating apparatus which can be detected which are not yet rated as malfunctions but indicate a tendency towards the occurrence of malfunctions, said tendency signals being stored in said diagnosis memory as tendency codes, said tendency codes being transferable to said error code decoder means of said timer, and said timer being provided with a selecting means, said selecting means being one of operable automatically and operable by a user of the vehicle, said selecting means for suppressing received tendency codes or indicating received tendency codes via said display device.

* * * * *